(12) United States Patent
Cannon et al.

(10) Patent No.: US 7,645,114 B2
(45) Date of Patent: Jan. 12, 2010

(54) VISCOUS PRODUCT TRANSPORTATION TRAILER

(75) Inventors: John F. Cannon, Fond du Lac, WI (US);
John R. Schaupp, Green Bay, WI (US);
John L. Rademacher, Fond du Lac, WI (US)

(73) Assignees: Brenner Tank LLC, Fond Du Lac, WI (US); P&S Investment Company, Inc., Green Bay, WI (US)

( * ) Notice: Subject to any disclaimer, the term of this patent is extended or adjusted under 35 U.S.C. 154(b) by 278 days.

(21) Appl. No.: 11/425,270

(22) Filed: Jun. 20, 2006

(65) Prior Publication Data

US 2007/0000545 A1 Jan. 4, 2007

Related U.S. Application Data

(60) Provisional application No. 60/695,148, filed on Jun. 29, 2005, provisional application No. 60/758,438, filed on Jan. 12, 2006.

(51) Int. Cl.
*B65G 65/34* (2006.01)
*B01F 11/00* (2006.01)
*B60P 3/22* (2006.01)

(52) U.S. Cl. ................ 414/810; 366/188; 280/830

(58) Field of Classification Search .......... 137/338, 137/560; 222/196; 404/363, 375; 366/108–128; 414/810; 280/830, 838
See application file for complete search history.

(56) References Cited

U.S. PATENT DOCUMENTS

| | | | | |
|---|---|---|---|---|
| 2,655,792 | A | * | 10/1953 | Lagrange .................... 165/41 |
| 3,280,301 | A | | 10/1966 | Anderson et al. |
| 3,359,971 | A | | 12/1967 | Snelling |
| 3,592,513 | A | * | 7/1971 | Murfitt ........................ 406/136 |
| 3,860,018 | A | | 1/1975 | Reiter |
| 4,082,672 | A | * | 4/1978 | Petroski ....................... 210/205 |

(Continued)

FOREIGN PATENT DOCUMENTS

DE 862120 1/1953

(Continued)

*Primary Examiner*—Stephen Hepperle
*Assistant Examiner*—Atif H Chaudry
(74) *Attorney, Agent, or Firm*—Whyte Hirschboeck Dudek S.C.

(57) ABSTRACT

Described herein is a transport tank trailer having a tank that can be used to more completely and effectively transport, store, load and unload a viscous product, such as a viscous liquid product, or liquid with solid(s) in suspension. Materials for transport, storing, loading and unloading include both food-grade and non-food grade products. Exemplary products include chocolate, paint, wastes, and asphalt. The tank system involves: a) agitation means (e.g., vibration devices) to force viscous product to flow during unloading; b) a heat-traced closed loop venting and unloading system resulting in the elimination of opening of the manhole on the tanker, which results in the release of heat; c) use of enhanced insulating materials to reduce product solidification during product discharge; and d) reduction of thermal bridges to increase product heat retention. The invention also involves an inventive cargo tank shape that promotes viscous product discharge during unloading of the tank. The viscous product trailer can further comprise a heated make-up air system operably associated with the tank housing. The system can provide heat vented air and heated air into the tank interior containing viscous product so as to maintain tank, and consequently product, temperature.

18 Claims, 5 Drawing Sheets

U.S. PATENT DOCUMENTS

| | | |
|---|---|---|
| 4,175,906 A | 11/1979 | Johnston |
| 4,224,006 A | 9/1980 | Dumbaugh |
| 4,295,775 A | 10/1981 | Cottrill |
| 4,349,328 A * | 9/1982 | Allen .......................... 425/456 |
| 4,836,417 A * | 6/1989 | Uchiyama et al. ............. 222/63 |
| 4,979,829 A | 12/1990 | Allen |
| 5,029,645 A | 7/1991 | Allen |
| 5,433,520 A | 7/1995 | Adams |
| 5,779,427 A | 7/1998 | Heffinger |
| 6,306,191 B1 * | 10/2001 | McInerney et al. ......... 55/385.4 |
| 6,558,111 B2 * | 5/2003 | Wilson et al. ............... 414/810 |
| 6,916,025 B2 | 7/2005 | Brisson |
| 7,360,534 B2 * | 4/2008 | Krupp .................... 126/110 A |
| 2003/0047224 A1 | 3/2003 | Cohen |
| 2004/0184890 A1 | 9/2004 | Wu |
| 2005/0240024 A1 * | 10/2005 | Campbell et al. ........... 546/345 |

FOREIGN PATENT DOCUMENTS

| | | |
|---|---|---|
| DE | 901039 | 1/1954 |
| EP | 882620 A1 | 12/1998 |
| GB | 698091 | 10/1953 |
| GB | 811336 | 4/1959 |
| GB | 1280558 | 7/1972 |

* cited by examiner

FIG. 11 ated heat into the
VISCOUS PRODUCT TRANSPORTATION TRAILER

CROSS REFERENCE TO RELATED APPLICATION

This application is claims the benefit under 35 USC § 119(e) of U.S. Provisional Application Nos. 60/695,148, filed Jun. 29, 2005 and 60/758,438 filed Jan. 12, 2006.

FIELD AND BACKGROUND

The present invention relates to transportation trailers having cargo tanks, and more specifically to a viscous product transportation trailer cargo tank.

Transportation trailers are used to carry a variety of products, including viscous products, of both the food-grade and non-food-grade types. However, such products are often difficult to store and transport, and they are often even more problematic to unload. Due to the nature and properties of the product itself, unloading often results in an undesirable amount (often as much as 1% of the total load transported, or even more, of wasted product (i.e., heel) that remains in the tank following unloading.

The interior of trailers must be cleaned thoroughly between loads of excess heel (product left over following unloading of the tank). Current solutions require drivers or other service personnel to manually clean heel from the trailer tank. Such cleaning is time-consuming, and thus costly, and moreover, it can be dangerous since such cleaning requires the service personnel to climb on top of the trailer and enter the tank via a service manhole. This is a process that can result in injuries. Moreover, if the material being transported is a non-food-grade material, and in particular a hazardous material, the product itself can be very dangerous (e.g., fumes, flammability, etc.) to the cleaning person(s).

Thus, it would be desirable to provide for the unloading of viscous materials from cargo tank trailers in a manner that reduces or minimizes product waste, safely (e.g., with the service personnel accomplishing unloading at ground level) and in an economical fashion.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. Like reference numerals are used to indicate like components. In the drawings.

DETAILED DESCRIPTION OF THE PREFERRED EMBODIMENTS

Figure 1:
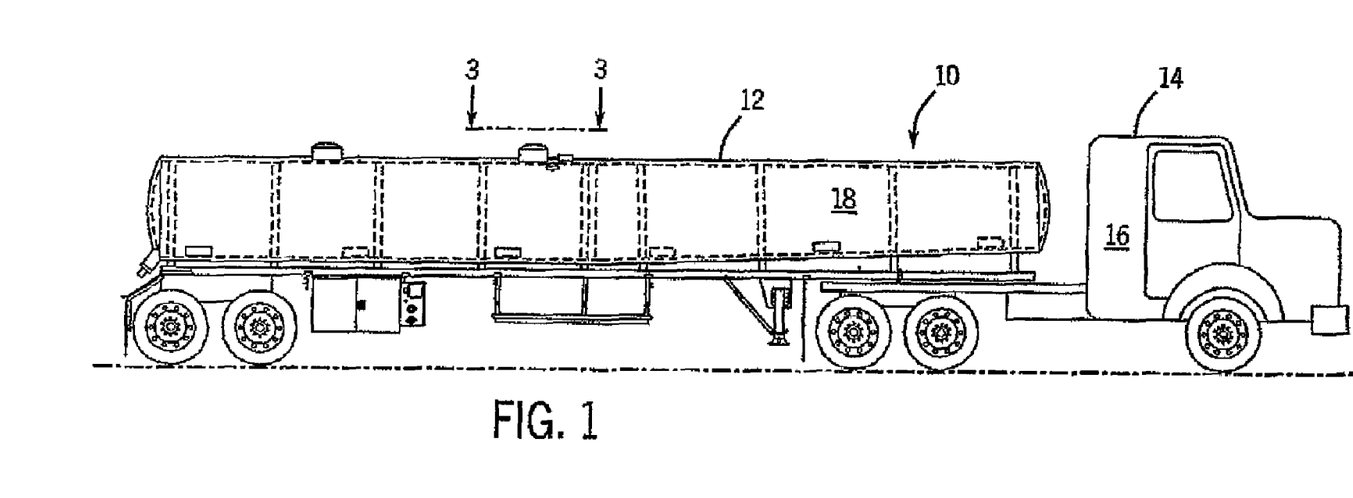
FIG. 1 is a schematic side view of a motor vehicle having a viscous product transportation trailer for unloading viscous product according to one aspect of the present invention.

FIG. 1 is a schematic side view of a cargo tank motor vehicle 10 having a viscous product cargo tank transportation trailer 12 for unloading viscous product, or viscous product transportation trailer, according to one aspect of the present invention. The vehicle 10 includes a tractor 14 having a cab 16 for towing the trailer, and the trailer includes a viscous product cargo tank 18. In one embodiment, the tank includes a single compartment or section and thus is capable of transporting a single product. In another embodiment, the tank includes a plurality of compartments, and thus, it is capable of transporting a plurality of material types, some or all of which might be viscous products. As used herein, "viscous products" include viscous liquid products, both of the food-grade and non-food grade types. Exemplary food grade viscous products include, but are not limited to, chocolate, and exemplary non-food grade materials include, but are not limited to, hazardous materials, such as paint. Moreover, "viscous products" are herein intended to include liquids with solids in suspension, and possibly wastes.

MC 300 series cargo tanks, DOT 400 series cargo tanks and non-DOT-specification cargo tanks are contemplated for use with the present invention. Such tanks can be constructed from mild or stainless steel, or aluminum (e.g., which, desirably, is a relatively light weight material) and typically have a cargo capacity of between 3,500-12,000 gallons.

Figure 2:
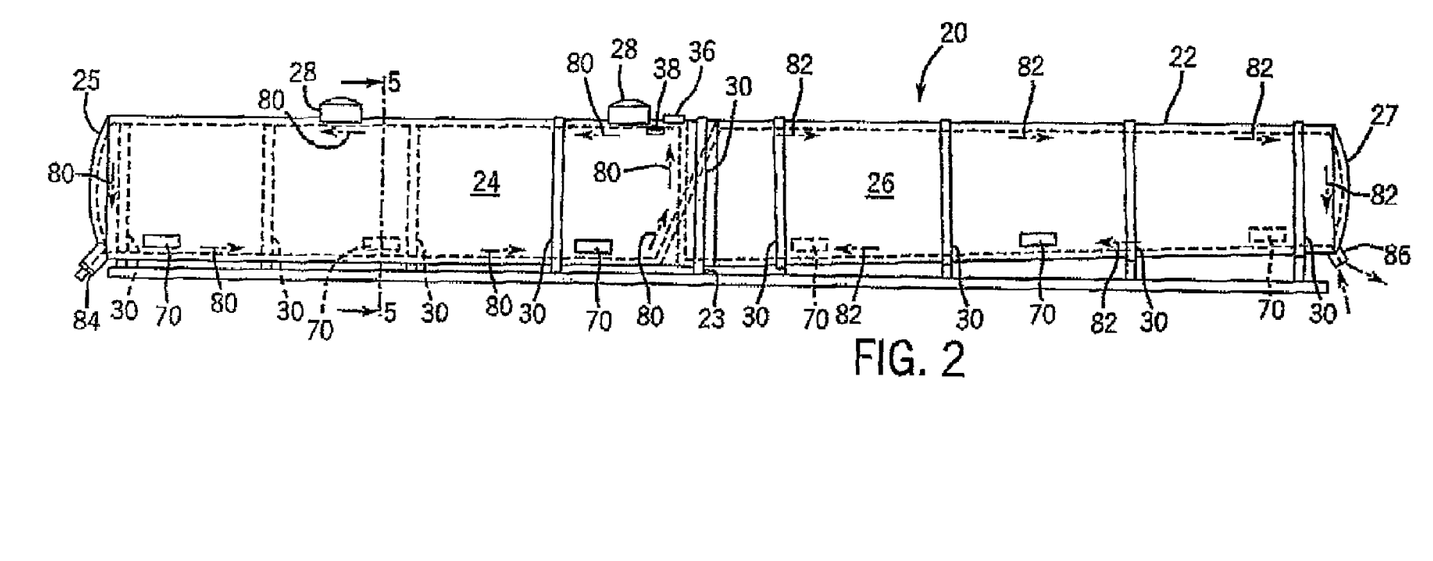
FIG. 2 is an enlarged view of one embodiment of an inventive viscous product cargo tank for storing, transporting and unloading viscous product.
Figure 3:
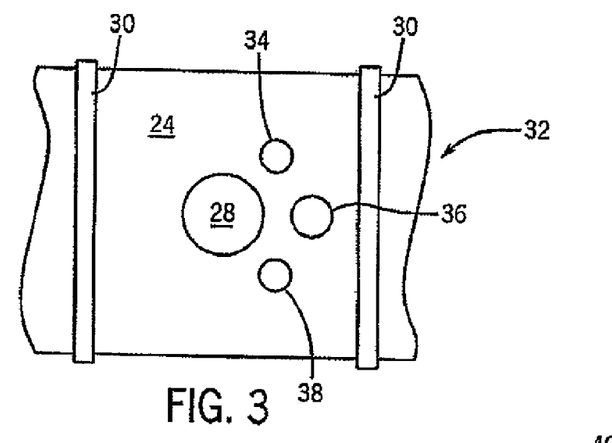
FIG. 3 is an enlarged top view of a top portion of the viscous product cargo tank taken along line 3-3 of FIG. 1.

FIG. 2 is an enlarged view of one embodiment of an inventive viscous product cargo tank 20 for storing, transporting and unloading viscous product. Tank 20 includes a housing or shell 22 having a cylindrical section 24 and a conical section 26 which are joined at a cylindrical-conical interface 23 and are bounded by torispherical heads 25 and 27, respectively. In one embodiment, the conical section can be a substantially truncated right circular cone or conical section. As shown, cylindrical section 24 includes manholes 28, located on top of the housing 22, to permit individuals to enter the housing for purposes of cleaning and servicing the tank. Tank 20 further includes stiffening rings 30 that serve to support, and thus enhance, the structural integrity of, the housing. FIG. 3 is an enlarged view of a top portion 32 of the viscous product transportation trailer cargo tank 20 taken along line 3-3 of FIG. 1. Referring to FIGS. 2-3, located within the shell portion 24, between rings 30 and near manhole 28 are heat porced vent 34, heat traced vent valve 36, and heat traced vacuum breaker 38. In one embodiment, vent valve 36 can be hydraulically operated. The positions of the vent, vent valve and vacuum breaker can be varied as needed depending on the particular dimensions and shape of the tank and the viscous material(s) contained, transported, stored, loaded and unloaded.

FIG. 3 is an enlarged view of a top portion 32 of the viscous product transportation trailer cargo tank 20 taken along line 3-3 of FIG. 1. Referring to FIGS. 2-3, located shell portion 24, between rings 30 and near manhole 28 are heat traced vent 34, heat traced vent valve 36, and heat traced vacuum breaker 38. In one embodiment, vent valve 36 can be hydraulically operated. The positions of the vent, vent valve and vacuum breaker can be varied as needed depending on the particular dimensions and shape of the tank and the viscous material(s) contained, transported, stored, loaded and unloaded.

Figures 4, 5:
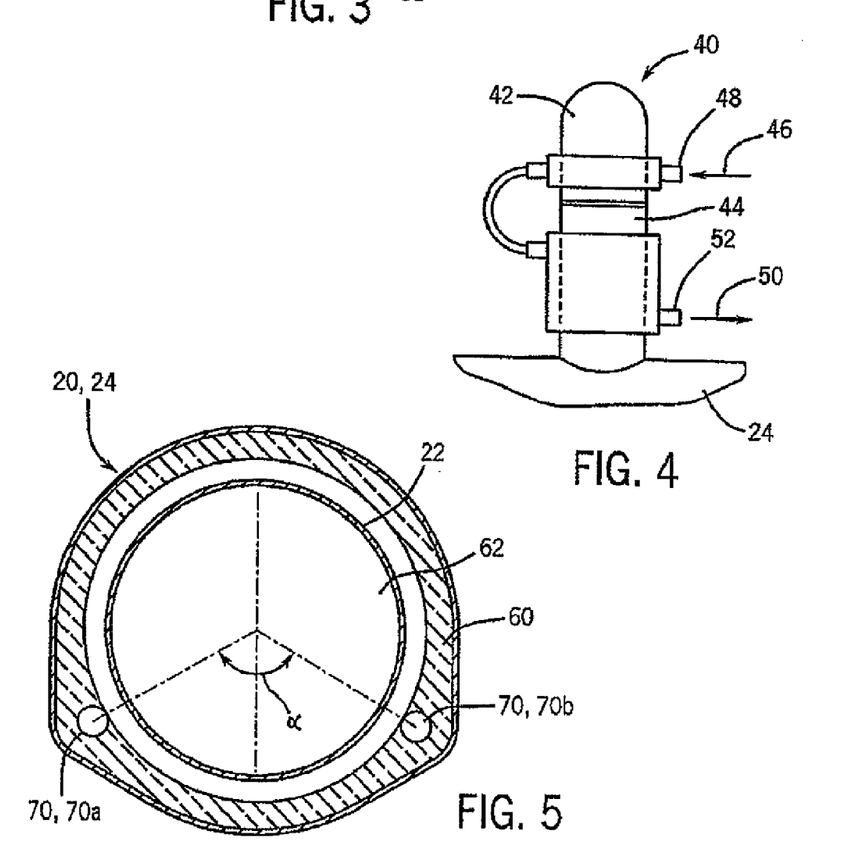
FIG. 4 is an enlarged view of a heat-traced assembly for use with the viscous product transportation trailer cargo tank.
FIG. 5 is an enlarged cross-sectional view of a portion of the viscous product cargo tank taken along line 5-5 of FIG. 2.

FIG. 4 is an enlarged view of a heat-traced assembly, generally referred to by numeral 40, also for use with the viscous product cargo tank of the present invention. Assembly 40 is connectable to housing or shell 22 and includes a vent, valve or vacuum breaker, collectively referred to by numeral 42 and a nozzle 44. Heat enters assembly 40, as indicated by arrow 46, via heat inlet 48 and exits the assembly, as indicated by arrow 50, via heat outlet 52.

FIG. 5 is an enlarged cross-sectional view of the viscous product cargo tank 20, and more specifically cylindrical section 24, taken along line 5-5 of FIG. 2. Referring to FIGS. 2 and 5, tank section 24 includes insulation material 60 that, in one embodiment, can be a rigid insulation material suitable for use with the viscous product(s) contained with interior 62 of the tank 20, and bounded by housing or shell 22, which is referenced below.

Still referring to FIGS. 2 and 5, agitating devices 70 are positioned along housing 22 to force viscous product out of the tank 20 during unloading, thereby reducing product heel. In one embodiment, agitating devices 70 comprise a plurality of vibrators. In another embodiment, agitation can be accomplished using ultrasound, magnetic, or other excitation/agitation means. As shown, devices 70 are positioned along the tank housing sections 24, 26 in a longitudinal fashion, opposite one other. Stated another way, a first plurality of devices 70a are positioned in opposing fashion with respect to a second plurality of devices 70b. As shown specifically in FIG. 5, devices 70a and 70b can be positioned at an arc angle alpha, and in one embodiment, alpha is substantially equal to 120 degrees. As indicated in FIG. 2, the placement and number of devices 70 can vary to convenience, with alternative or additional devices shown in phantom. One device 70 contemplated for use in the present invention is DC-500, available from Vibco, located in Wyoming, R.I.

Referring to FIGS. 2-5, heat can be introduced into and circulated about cargo tank 20 via heat-traced inlet 40. Arrows 80, 82, indicate the circulation of heat about cylindrical and conical sections 24, 26 respectively. Heating viscous product within the tank and reducing thermal bridges can facilitate the maintenance of the material in a liquid state, thereby reducing product heel. As described with reference to FIG. 4, heat can enter and exit cylindrical section 24 at heat inlets and outlets 48, 52, respectively. Also, as shown in FIG. 2, tank 20 includes a heat-traced outlet valve 84 (connected to cylindrical section 24), which can be hydraulically operated. The circulation, venting and the like of heat within the viscous product tank of the kind described herein can be referred to as "heat-traced closed loop venting". One valve contemplated for use in the present invention is a 3", 180 degree "Cleanflow" hydraulic footvalve, available from Fort Vale, located in La Porte, Tex. Insulation material 60, shown in FIG. 5, can be incorporated so as to insulate any piece or section of exposed metallic material, thereby reducing heat loss (in less than desirable locations) from the tank. One type of insulation material contemplated for use in the present invention is polyisocyanurate foam, available from Dow Chemical Corporation, located in Midland, Mich.

Advantageously, using the heat-traced closed loop venting and unloading system obviates the need to open the manhole, particularly during unloading (which results in the release of heat). Moreover, the use of enhanced insulating materials reduces product solidification during product discharge. Thermal bridges are also reduced, which increases product heat retention.

Figure 6:
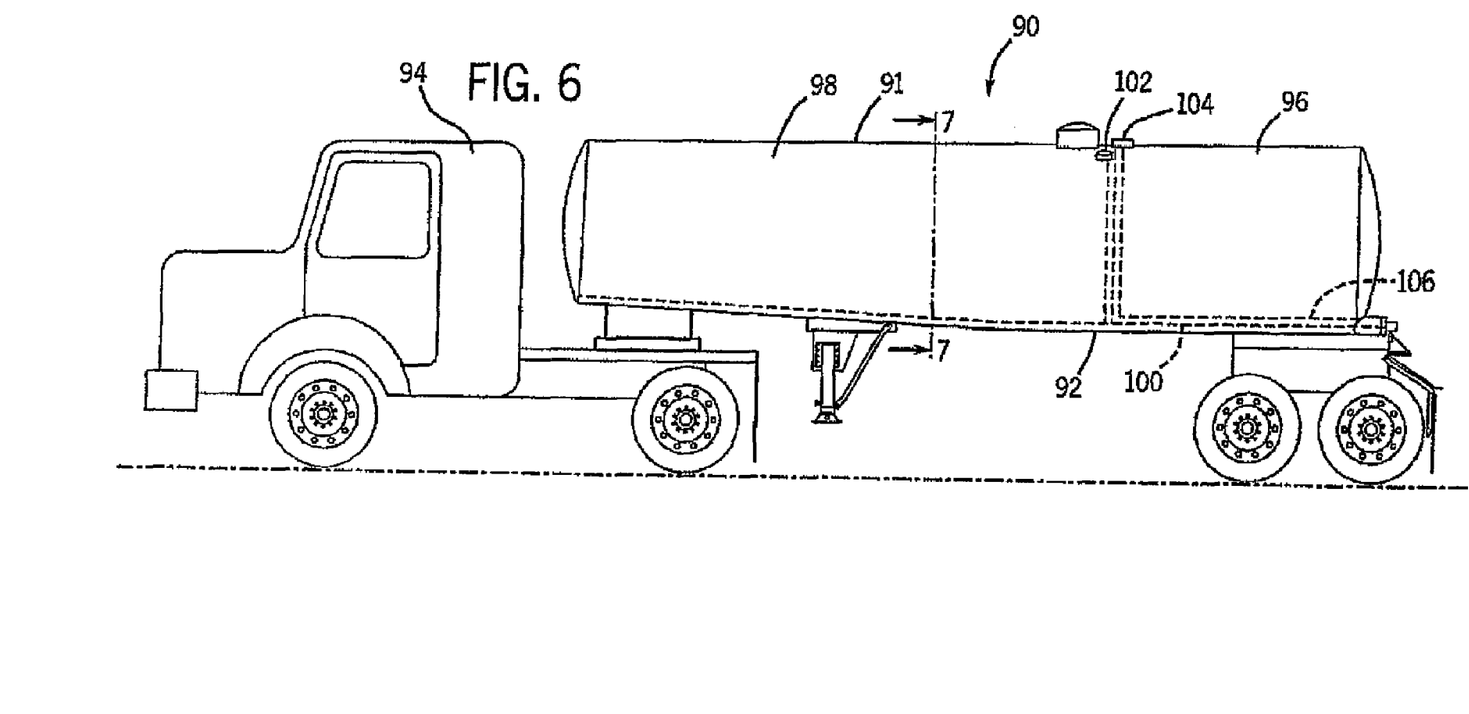
FIG. 6 is a schematic side view of a motor vehicle having a viscous product transportation trailer cargo tank for unloading viscous product according to one aspect of the present invention and illustrating the introduction of heat into the trailer from the motor vehicle.

FIG. 6 is another schematic side view of a motor vehicle 90 having a viscous product transportation trailer 92 for unloading viscous product, and connected to a motor vehicle 94, according to another aspect of the present invention. Trailer 92 again includes a tank having a cylindrical section 96 and a conical section 98 connected to the cylindrical section. Heat lines 100 are schematically illustrated and run to outlet vent(s) and vent valve(s), 102, 104, respectively. If the valves are hydraulic valves, hydraulic line(s) 106 are shown and run to the valves. Heat can be obtained from the motor vehicle or tractor 90.

Figure 7:
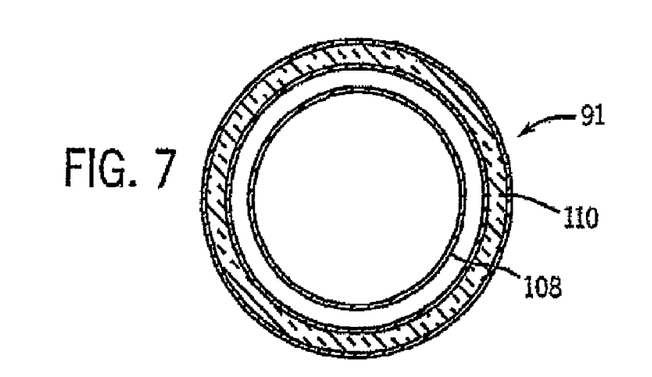
FIG. 7 is an enlarged cross-sectional view of a portion of the viscous product transportation trailer cargo tank taken along line 7-7 of FIG. 6.

And FIG. 7 is an enlarged cross-sectional view of a viscous product transportation trailer cargo tank 91 taken along line 7-7 of FIG. 6. Here again, the tank includes a housing 108 and insulation 110. The tank structure and insulation material provide various benefits, including those previously noted.

In the present invention, it has been found that the shape of the housing can contribute to the handling, and in particular the unloading, of the viscous product to reduce product heel (i.e., product left behind or remaining in the interior of the housing) that typically constitutes waste. The conical section promotes flowing of viscous product, and more specifically viscous liquid product during unloading, due to gravitational forces. Still, other cargo tank shapes are contemplated and considered within the scope of the present invention. For example, in one embodiment (although not shown), the tank can include a pair of conical portions, and can be termed a "double conical" tank. And in another embodiment (again not shown), the tank can comprise a straight cylindrical portion, and can be termed a "round" tank.

Figure 8:
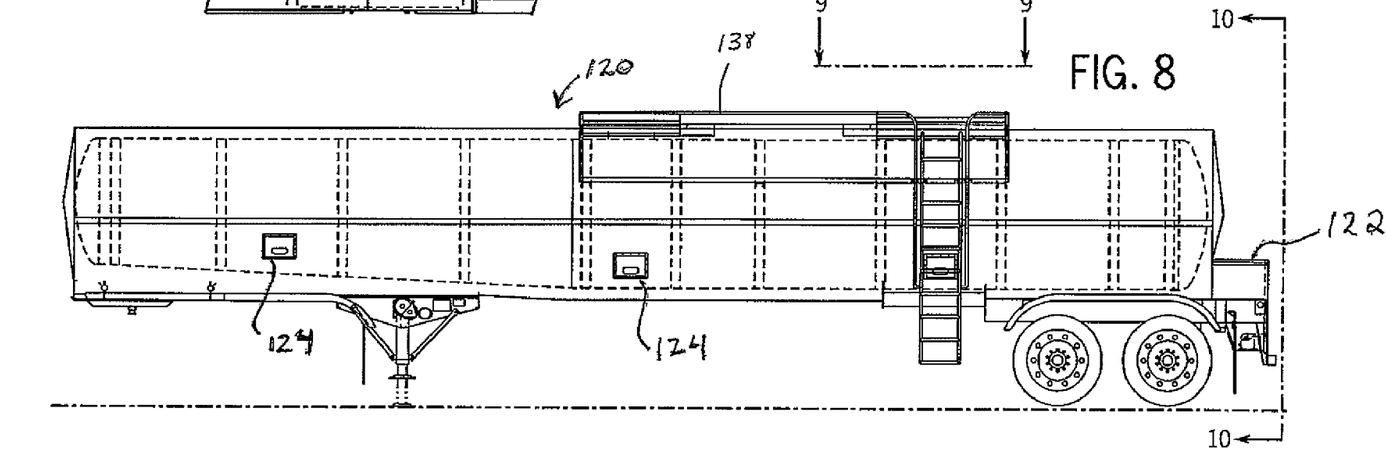
FIG. 8 an enlarged view of another embodiment of an inventive viscous product transportation trailer cargo tank for storing, transporting and unloading viscous product according to one aspect of the present invention, with the cargo tank shown to include a heated cabinet assembly and an agitating assembly.

FIG. 8 an enlarged view of another embodiment of a viscous product transportation trailer cargo tank 120, similar to that described previously (e.g., FIGS. 1, 2 and 6), according to one aspect of the present invention. Again, the tank 120 is used for storing, transporting and unloading viscous product, both of the food-grade (e.g., chocolate) and non-food grade (e.g., paint) varieties. In the present embodiment, the cargo tank 120 is shown to include a heated cabinet assembly 122 and a plurality of agitating assemblies 124. The agitating devices (in this case vibrators) are positioned along the tank housing of the trailer to force viscous product out of the tank during unloading, thereby reducing product heel. While only one side of the trailer is shown, in the embodiment illustrated pairs of agitators are positioned on the trailer opposite one another. Stated another way, the agitating device pairs are positioned along the tank housing, and more specifically along its base, in a longitudinal fashion, opposite one other (another example of this type of arrangement is shown in FIG. 5).

In a preferred embodiment, the agitating devices 124 pulse for discrete, predetermined periods of time, and in staggered fashion (e.g., one set or pair of opposing agitators pulses, and then the next, and so forth). Where several sets or pairs of agitators are used and positioned on the tank, the agitators can similarly pulse, for example, from front to back, or from back to front. In general, it has been found that such discrete and staggered pulsing encourages product flow and serves to improve or enhance energy savings (when compared to the energy usage associated with continuous pulsing). In one embodiment (not shown), three sets of agitators positioned lengthwise along the trailer in opposing fashion can be used, with agitation taking place as follows: the front-most agitators (e.g., the agitators closest to the cab) pulse first, then the middle agitators pulse, and finally the rear-most agitators pulse, and with staggered pulsing cycle repeating until unloading is complete (or substantially complete). It is contemplated the predetermined period of "agitation" (e.g., vibration, pulse, etc.) time can and shall vary, at least in part, with the viscous product being transported, and in one embodiment the predetermined period of time is about five (5) seconds. Further, it is contemplated that additional agitators can be used, and the specific arrangement can vary based on predetermined criteria (e.g., the type of viscous material being transported).

Figure 9:
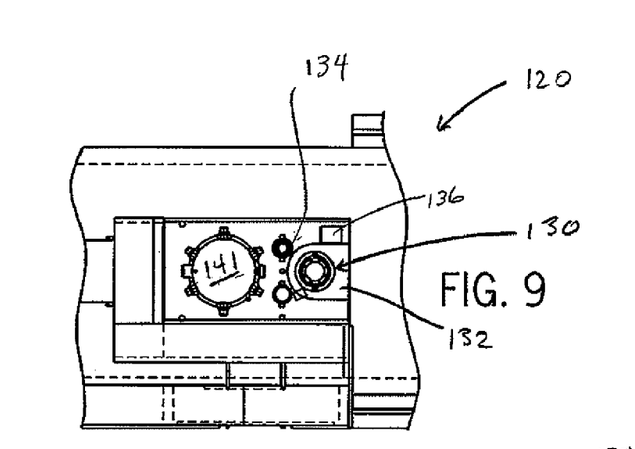
FIG. 9 is a top view taken along line 9-9 of FIG. 8 showing a portion of the cargo tank having a heated make up air assembly.

FIG. 9 is a top view taken along line 9-9 of FIG. 8 showing a portion of the cargo tank 120 having an exemplary heated make-up air assembly, generally referenced by the numeral 130, in accordance with one embodiment of the present invention. Often, the viscous product is a product (e.g., chocolate) that is transported and unloaded at an elevated temperature to prevent product solidification and, in one embodiment, the internal sidewalls of a tank are maintained or kept at an elevated temperature (e.g., about 120 degrees Fahrenheit) in a manner described above. However, during unloading, replacement air is allowed to vent into the tank to prevent damage or collapse of the tank due to vacuum. It is desirable for such replacement air (or "make-up air") to be heated so as to maintain tank temperature, and this in turn serves to maintaining the temperature of viscous product contained within the tank.

Still referring to FIG. 9, the heated make-up air system 130 as shown includes a heat cover 132, and the cover is connected to the tank 120, and in particular a spill dam floor 134 of the trailer. The system 130 further includes a heating device 136 (e.g., a space heater or heater of a similar type), which is utilized to heat and pump heated air into the trailer to maintain consistent and relatively constant temperature. A vent is located under the cover (and thus is hidden from view) and can be limited to draw from heated air. In at least one embodiment, the heating device 136 can be plugged into an off-truck power supply. The system can further include a thermometer (not shown) that can be used primarily for direct temperature monitoring. And in a preferred embodiment, the heated make-up air system includes a heated poppet valve (not shown) to allow for entry of heated make-up air into the tank.

In general, the heated make-up air assembly 130 can be utilized to heat vented air and provide or return heated air into the tank containing viscous product so as to maintain tank, and consequently product, temperature. In at least one embodiment, all, or substantially all, of the air entering the heated cabinet assembly 122 can be heated.

Referring to FIGS. 8-9, the tank 120 advantageously includes a cat-walk 138 connected to the tank 120, and the cat-walk structure is capable of supporting one or more individuals/operators. The catwalk 138 improves overall safety for operators during, for example, loading and unloading of the viscous product from trailers and facilitates observation of the viscous product flow during such loading and unloading, for example as shown, via a manhole 141 (FIG. 9) located on top of the tank 120. In addition, a control panel (not shown) can be provided that is in operative association with the trailer. The control panel can be used for controlling various aspects of the trailer that are automated, for example, heating of the viscous product.

Figure 10:
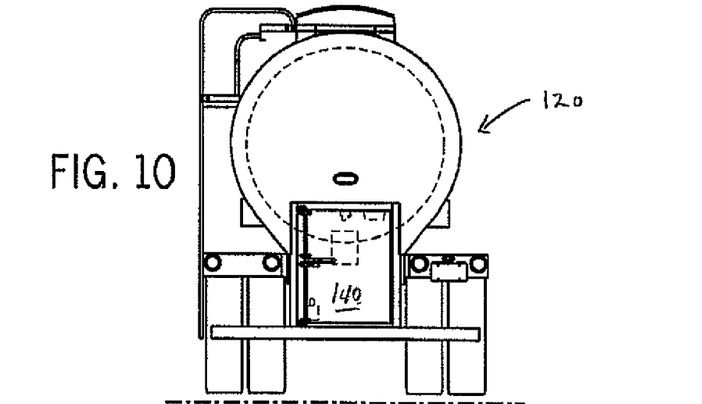
FIG. 10 is a rear view taken along line 10-10 of FIG. 8 showing the heated cabinet assembly in accordance with one aspect of the present invention.
Figure 11:
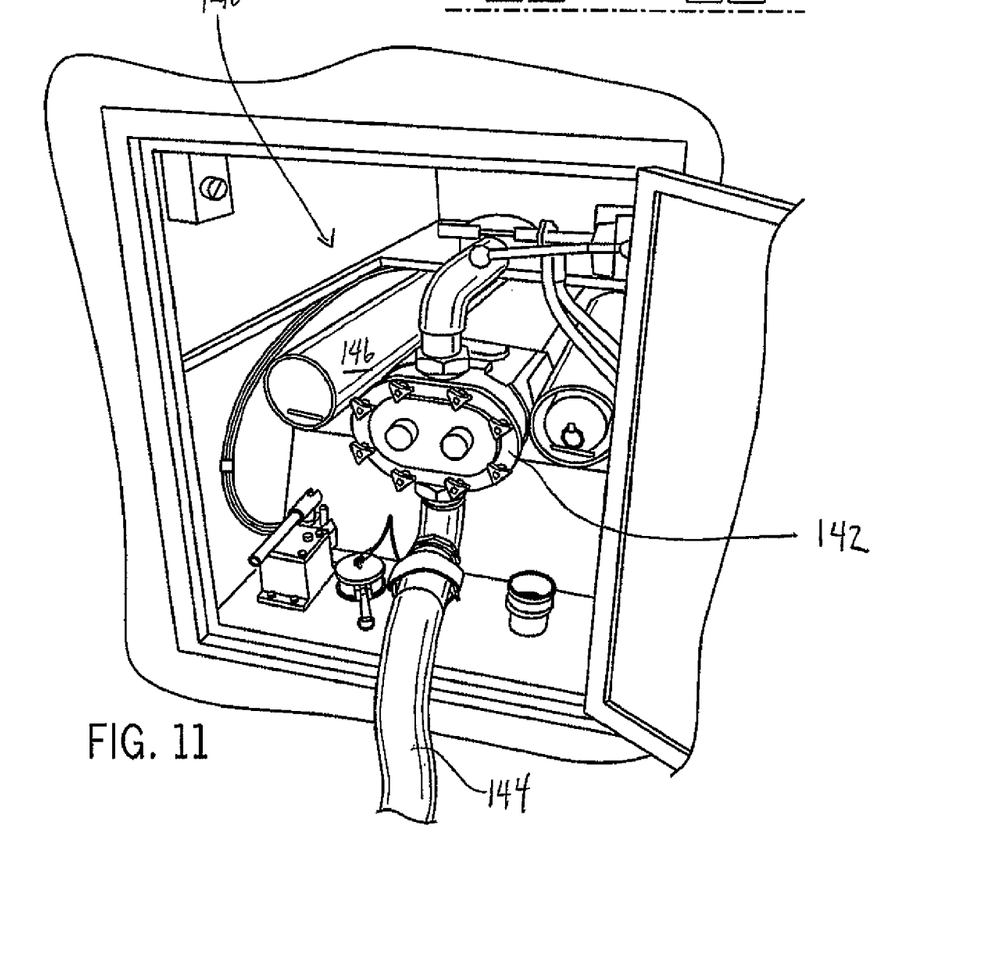
FIG. 11 is an enlarged, partially schematic view of the heated cabinet assembly.

FIG. 10 is a rear view of the tank 120 taken along line 10-10 of FIG. 8 showing the heated cabinet assembly 140 in accordance with one aspect of the present invention (with the housing door closed). FIG. 11 is an enlarged, partially schematic view of the heated cabinet assembly (with the housing door open) thereby illustrating various components of the system during loading and unloading. Referring to FIGS. 10-11, in one embodiment, the heated cabinet assembly 140 includes a hydraulically-driven viscous product pump 142 that is used to power a piston (not shown), and which in turn drives a butterfly valve (also not shown). The valve is used to open or close a vent so as to allow air into (or prevent air from escaping out of) the tank 120 during product loading/unloading. Viscous product can be unloaded, as shown, via a discharge hose 144, Various other devices and components can be positioned within the cabinet assembly 140. For example, a discharge hose storage means 146 is also shown. It should be understood that the heated cabinet assembly 140 and its various components are illustrated in exemplary fashion and alternative components and arrangements are possible and considered within the scope of the present invention.

Various advantages can result from one or more of the embodiments disclosed and/or contemplated herein. Using a trailer of the kind described above, and with the trailer used to transport viscous chocolate material, the advantages and information listed below has been noted.

Product Heel

Product heel is reduced substantially. In one example, product heel or waste was reduced by 50%, or even more. In one application, product heel was reduced by about 300 pounds on a per load basis. Using 150 loads as an annual load figure, and with a cost per pound of chocolate carried of approximately $1.00 per pound, annualized savings can be projected at approximately $45,000.

Furthermore, reduced product heel results in reduced heel or excess heel charges to customers, as well as reduced associated administrative and processing time by the seller associated with such charges. Costs to the shipper and/or customer can accrue, particularly when heel constitutes more than 1% of a typical load (a frequent occurrence using prior solutions), as well as associated charges (e.g., charges for use of an outside wash rack).

Unloading Time

Detention time charges to a typical consignee are reduced substantially, for example, on the order of about 30%. This can also result in the ancillary benefit of a driver spending less time on the trailer (e.g., walking along the catwalk).

Cleaning/Waste

Cleaning time is reduced because there is less product heel. More specifically, reduced product results in reduced overall product waste material. This in turn results in the driver or other personnel charged with cleaning the tank (e.g., scraping the interior tank wall) following unloading spending less time cleaning the tank. As one example, with a reduction of product heel of about 300 pounds of chocolate material, with an annualized figure of 150 loads, and with a product heel disposal cost of $0.04 per pound of material, additional annualized cost savings of about $1,800 can be expected due to the reduction of material disposed.

Moreover, it is typical to require "chipping out" (cleaning) of the tank of solidified chocolate from one load to the next. Using the present invention, such "chipping out" can be eliminated in about 10% of the overall loads (15 times per year), and as such, the costs associated with such work (e.g., work time and hot water or other cleaning solution cost) is eliminated. Additionally, improved product quality is associated with reduced cleaning, as well as the overall system design (e.g., tank design, heating system design, closed loop system, etc.).

Driver Retention

Driver retention is expected to increase due to a variety of factors, including improved job satisfaction relating to improved characteristics of the tasks (e.g., cleaning) associated with the work. Costs associated with driver retention can be substantial. In one example, it has been found that it can cost as much as $7,000 to train one new driver.

Energy Savings

It has been found that the present invention can result in a reduction of fuel used during unloading. In one example, a fuel savings of about 0.5 gallons per unload was noted.

Productivity

Using the present invention, additional loading opportunities can be realized, resulting in increased productivity. It is anticipated that at least two incremental additional loads can be made for a typical tractor trailer combination as a result of the present invention. This can result in increases in overall revenue. In one example, the increase has been found to be about $800 of revenue per load. Additionally, incremental cost savings of about $200 per load has been determined. This serves to maximize productive hours of service.

Efficiency

Additionally, it has been determined that the overall efficiency associated with each load, and in particular with loading/unloading of the trailer, is increased when the present invention is practiced. Factors affecting efficiency include recruiting time, training time, turnover and errors made during the loading/unloading procedures.

The aforementioned benefits, which are believed to be substantial, should not be considered limiting in any way. Rather, the above information is intended to be indicative of the potential advantages associated with implementation and use of the present invention in the transport, loading and unloading of viscous product materials.

While the present invention has been described in terms of a preferred embodiment(s), it is recognized that equivalents, alternatives, and modifications, aside from those expressly stated, are possible and within the scope of the appending claims. For example, viscous product cargo tanks can be newly installed or, older cargo tanks can be retrofitted with the assemblies and apparatuses described herein.

What is claimed is:

1. A method for unloading a viscous product from a tank trailer for transporting and storing a viscous product and comprising a housing having an interior, and a plurality of vibrating devices positioned along the housing, wherein the plurality of vibrating devices includes at least three pairs including a front pair of vibrators, a middle pair of vibrators and a rear pair of vibrators, and the plurality of vibrating devices are configured for a discrete and staggered pulsing operation, the method comprising:

forcing the viscous product, during unloading of the tank trailer, from the interior of the housing to the outside, thereby reducing an amount of product remaining in the interior following the unloading, wherein forcing the viscous product from the interior of the housing comprises utilizing the plurality of vibrating devices including a first plurality of vibrating devices positioned along the housing, and a second plurality of vibrating devices positioned opposite the first plurality of vibrating devices;

wherein the viscous product comprises a viscous liquid food or non-food grade product and/or a liquid with solid in suspension, and further wherein the discrete and staggered pulsing operation is carried out such that the front pair of vibrators is pulsed first, followed by the middle pair of vibrators, and then the rear pair of vibrators to force the viscous product from the interior of the housing or such that the rear pair of vibrators is pulsed first, followed by the middle pair of vibrators, and then the front pair of vibrators to force the viscous product from the interior of the housing.

2. The method of claim 1 wherein the viscous liquid product is a food product.

3. The method of claim 1 wherein the viscous liquid product is a hazardous material.

4. The method of claim 1 wherein agitating the viscous product is accomplished by a first and second plurality of vibrating devices with the second plurality of vibrating devices being positioned opposite the first plurality of vibrating devices.

5. The method of claim 4 wherein the first and second pluralities of vibrating devices are staggered longitudinally with respect to each other to facilitate a pulsing operation.

6. The method of claim 4, wherein the first plurality of vibrating devices is positioned at an arc angle of 120 degrees to the second plurality of vibrating devices for accomplishing agitating.

7. The method of claim 1 further comprising:
providing a tank housing including a substantially cylindrical portion and a substantially truncated right circular cone portion positioned substantially adjacent the substantially cylindrical portion.

8. The method of claim 1 wherein the viscous product is chocolate.

9. The method of claim 1 wherein the viscous product is paint.

10. The method of claim 1 further comprising heating the viscous product and wherein heating of the viscous product is accomplished using at least one of a heat-traced loop and a heated make-up air system.

11. The method of claim 10 wherein the heating is accomplished using a heated make-up air system that is operably associated with the tank housing, and the system used to heat vented air and provide heated air into the tank interior containing viscous product so as to maintain product temperature.

12. The method of claim 1, wherein as a result of agitating, the amount of product remaining in the interior following the unloading is reduced by 50%.

13. The method of claim 1, wherein agitating is accomplished by ultrasound means.

14. The method of claim 1, wherein agitating is accomplished by magnetic means.

15. The method of claim 1, wherein the viscous product is waste material.

16. The method of claim 1, wherein the housing comprises a cylindrical section and a truncated conical section connected to the cylindrical section, wherein the truncated conical section promotes flowing of the viscous product during unloading due to gravity.

17. The method of claim 1, wherein the discrete and staggered pulsing operation is carried out every five seconds.

18. The method of claim 1, further comprising:
providing a heated make up air assembly for maintaining a temperature within the tank, and thereby maintaining another temperature of the viscous product, the heated make-up air assembly comprising (i) a heat cover connected at least indirectly to the tank trailer; and (ii) at least one heating device for heating and pumping heated air into the tank trailer; and circulating heat about the housing for heating the viscous product therein to reduce thermal bridges.

* * * * *